Patented May 1, 1923.

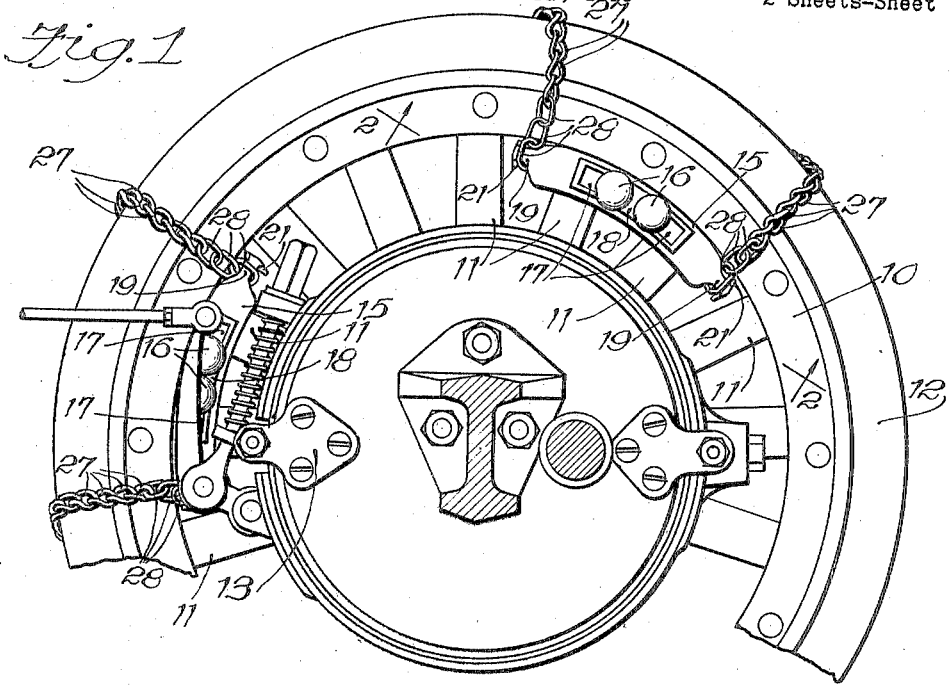

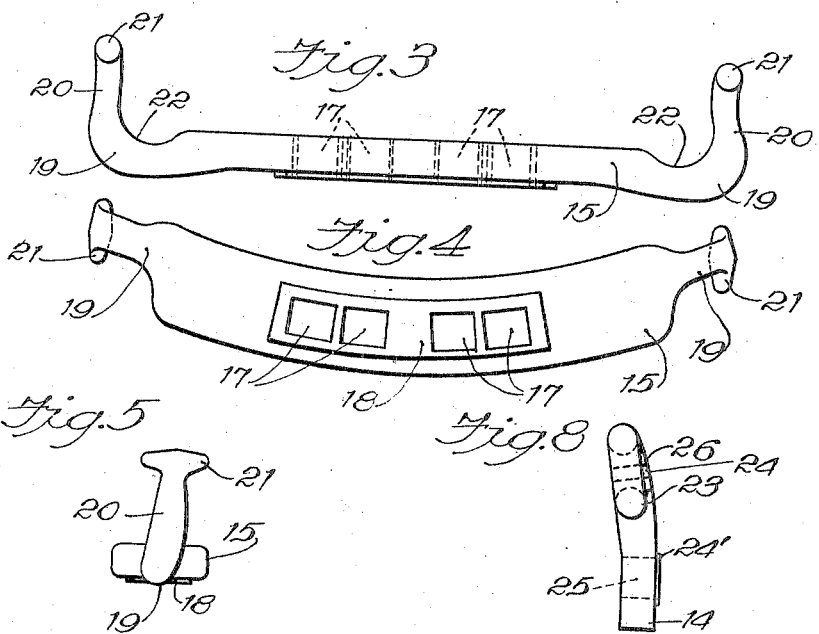
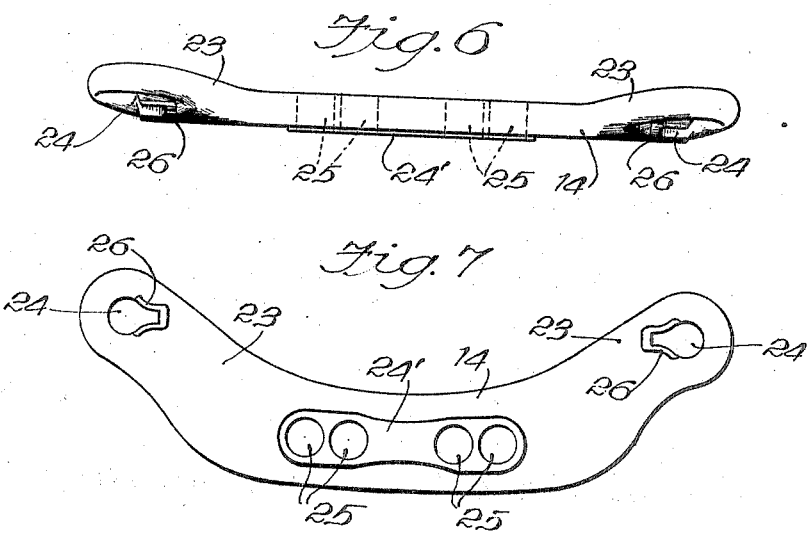

1,453,360

UNITED STATES PATENT OFFICE.

WILLIAM H. KRUG, OF OSHKOSH, WISCONSIN.

ANTISKID DEVICE FOR VEHICLES.

Application filed January 31, 1919. Serial No. 274,163.

*To all whom it may concern:*

Be it known that I, WILLIAM H. KRUG, a citizen of the United States, residing at Oshkosh, in the county of Winnebago and State of Wisconsin, have invented a certain new and useful Improvement in Antiskid Devices for Vehicles, of which the following is a full, clear, concise, and exact description, reference being had to the accompanying drawings, forming a part of this specification.

My invention relates to improvements in anti-skid devices for vehicles, and is especially concerned with means of this character intended to be used in connection with trucks or other vehicles intended to carry heavy loads. My invention is not, however, limited to this use, but is capable of other adaptations.

The objects of my invention are:

First: To provide means for securing anti-skid chains to the rear wheels of vehicles wherein the brake construction is such as to leave very slight clearance between the inner side of the wheel and the brake apparatus.

Second: To provide means whereby individual anti-skid chains can be easily and quickly attached to vehicle wheels.

Third: To provide means for securing anti-skid chains to vehicle wheels, comprising two members, one of said members being provided with projections for receiving one end of the chains, and the other of said clamping members being provided with means for securing the other ends of the chains thereto in such a manner as to prevent the first mentioned ends of the chain from being detached from the first mentioned member without first detaching the last mentioned ends from their clamping member.

Fourth: To provide means for securing anti-skid chains to wheels wherein the spokes are spaced apart various distances. And Fifth: To provide devices of the character described which are simple in construction and economical to manufacture.

Other objects will appear as this description progresses, reference being had to the accompanying drawings, in which:

Figure 1 is a fragmentary side elevation of the inner side of the rear wheel of a truck, portions of the braking mechanism being illustrated, and the supporting axle and driving axle being shown in section, the wheel being equipped with my improved means for securing anti-skid chains thereto.

Figure 2 is a fragmentary section through the wheel taken on line 2—2 of Figure 1.

Figures 3, 4 and 5 are edge view, side elevation, and end views respectively of one of the clamping bars or members by means of which I secure the ends of the chains to the inner sides of the vehicle wheels.

Figures 6, 7, and 8 are edge view, side elevation, and end views of the clamping member which I employ for securing the outer ends of the anti-skid chains to the vehicle wheels. And Figure 9 is a side elevation of a coupling member which I employ for securing the outer ends of the anti-skid chains to the corresponding clamping bar.

Throughout the several views similar reference characters are employed to refer to similar parts.

In certain trucks now upon the market the brake mechanism is of such dimensions and construction as to leave but very small clearance between this mechanism and the inner sides of the wheels. Considerable difficulty has heretofore been experienced in providing means for securing anti-skid chains to wheels of this type, by reason of the fact that most of the devices for securing anti-skid chains to wheels project to such an extent on the inner side of the wheels that they strike against and otherwise interfere with the brake mechanism. Certain devices have been constructed to eliminate this difficulty, but the devices so far in use have had certain defects which it is the object of my invention to overcome. One of the objects of my invention is to provide means for securing the anti-skid chains to vehicles which is so simple in construction and operation that it requires but an instant of time for the anti-skid chains to be attached, and of such construction that after the chains have once been attached there will be no likelihood of their becoming detached and lost. I have accomplished this and other objects by means of the devices illustrated in the acompanying drawings.

Referring to Figure 1, the reference character 10 indicates the felly of a wheel, and reference characters 11 indicate the spokes thereof. This wheel is provided with a suitable tire 12, which may be of any desired type or construction. The reference character 13 indicates as a whole a brake mechanism of well known construction which it is thought unnecessary to describe in detail. It should be noted, however, that portions of this apparatus extend outwardly from the center of the wheel to a position adjacent to the felly, so that it is impossible to use any means for securing the chains to the wheel which will project inwardly from the felly or spokes.

My improved means for securing the chains to the wheel comprise a pair of clamping bars 14 and 15 respectively. The clamping bar 15 is positioned upon the inner side of the wheel, and the clamping bar 14 on the outer side thereof, these two clamps being secured to a pair of adjacent spokes 11 by means of bolts 16 which pass through suitable openings 17, two pairs of which are formed in bar 15. Throughout this specification and the claims appended hereto it is to be understood that the words "inner side" as applied to the wheel of the vehicle, refer to the side of the wheel toward the vehicle, and that the words "outer side" mean the opposite side of the wheel. These openings likewise pass through re-enforcing ribs 18 formed integrally with the clamping bars. As shown in Figures 3, 4 and 5, the clamping bar 15 is curved longitudinally to conform approximately to the curvature of the felly of the wheel to which it is to be attached, and is provided at each end with shank portions 19,—that is, portions reduced in cross-section,—which first extend substantially parallel with the body portion of the clamping bar and then extend substantially at right angles thereto, as shown at 20 in Figure 3. The free ends of the shank portions are provided with crossheads 21 for a purpose which will presently be described. In use, the clamping bars 15 are clamped to the spokes of the wheels in such position that the portions 20 of the shanks extend inwardly between adjacent spokes. As shown at 22 in Figure 3, the shank portions are provided with recesses which are adapted to receive the links at the ends of anti-skid chains.

As shown in Figure 5, the portion 20 of each of the clamping bar shanks 19 is inclined to the plane of the body portion of the clamping bar 15, or in other words is not disposed quite at right angles to the body portion of the clamping bar. The clamping bars 15 are secured to the spokes of the wheels in such a manner that these portions 20 incline toward the centers of the wheels.

The clamping bars 14, which are illustrated in detail in Figures 6, 7 and 8, comprise a body portion having the edgewise offset end portions 23, which are provided with key-hole slots 24. The body portions of these clamping bars are likewise approximately conformed to the inner contour of the felly of the wheel to which they are to be attached. It will be noted that the offset portions 23 of these clamps are inclined to the body portion of the clamps as shown in Figure 8. These clamps are provided with longitudinally extending re-enforcing ribs 24', which re-enforce the margins of the two pairs of openings 25—25 which are formed in each of the bars 14. The reference character 26 indicates a cam rib which is formed adjacent one end of the slot portion of the key-hole slot at each end of the clamping bars 14. The function of this portion of my clamp will be referred to later on.

As shown in Figures 1 and 2, the anti-skid chains which I prefer to use have tread portions made of twisted links 27 and end portions of straight links 28. After the clamping bars 14 and 15 have been secured to the wheels at desired intervals, all that is necessary to do to secure the chains to the wheels is to pass the straight links 28 at one end of the chains over the crossheads 21 of the clamping bars 15 and then pass the chains about the tire of the wheel. I provide the other ends of the chains with the coupling members shown in Figure 9, which comprise a shank portion 30 having reversely curved portions 31 and 32 at opposite ends thereof, the portion 31 being provided with an elongated crosshead 33, and the portion 32 being provided with an enlargement 34. Coupling members are secured to the ends of the anti-skid chains by manipulating the crosshead 33 through the straight links. To secure these ends of the chains to the clamping bars 14, the cross heads 33 are manipulated through the the key-hole slots 24 at the ends of the clamping bars 14.

The coupling members 30 are illustrated and described in detail in my Patent No. 1,302,470, April 29, 1919, and further detailed description thereof appears to be unnecessary. It is sufficient to state that these coupling members can be secured to the clamping bars 14 without leaving sufficient slack in the anti-skid chains to permit the opposite ends of the chains from becoming detached from the clamping bars 15. In other words, after the outer ends of the anti-skid chains are secured to the clamping bars 14, the inner ends are locked to the clamping bars 15, and it is impossible to detach them therefrom until the coupling members 30 are detached from the clamping bars 14. Consequently I gain all the advantage of the construction illustrated and described in my patent above referred to by using but a single one of the coupling members 30 for each of the anti-skid chains. My present construction makes it somewhat easier to attach the anti-skid chains to wheels than where I use two coupling members, such as shown in Figure 9, to secure each chain to the wheel, by reason of the fact that it is somewhat difficult to manipulate the coupling member 30 to secure a chain to the inner side of a vehicle wheel, but it is a comparatively easy matter to slip one of the straight links 28 of the chains over the crosshead 21 of the clamping bars 15. While I have described the links 28 as being of the straight type, it is possible to use links of any shape, providing they are large enough to be manipulated over the crossheads 21.

The function of the cam ribs 26 will now be briefly referred to. While the wheels to which anti-skid chains are attached by means of the structure just disclosed are rotating, it sometimes happens that the crossheads 33 position themselves substantially parallel with the key-hole slots 24. This can only take place, however, when the chains are on the vertical portions of the wheels and moving relatively thereto, and it is therefore quite unlikely that the crossheads 33 would become disengaged from the clamping bars 14 during the brief instant that the crossheads 33 are parallel with their respective slots. In order to further insure against such an occurrence, I provide the cam ribs 26, which are so positioned that they throw the crossheads 33 away from the bars 14 just before they assume a position parallel with the length of the key-hole slots, and thus prevent the crossheads from becoming uncoupled from the clamping bars 14. This construction is referred to at length in my Patent No. 1,305,377, June 3, 1919, and further description is believed to be unnecessary.

It will be noted that the openings 17 in the bars are square in contour. The purpose of this is to provide means for holding the bolts 16 against rotation when the nuts 35 are applied thereto, the shanks of these bolts being provided with portions adjacent their heads, which are square in cross-section, that co-act with the square openings in the clamping bars 15.

While I have described the details of the preferred embodiment of my invention, it is to be clearly understood that my invention is not limited to these details, but is capable of other adaptations and modifications within the scope of the appended claims.

Having thus described my invention, what I claim is:

1. The combination with a vehicle wheel of means for securing an anti-skid chain thereto, comprising a pair of bars, means for clamping said bars upon opposite sides of a pair of adjacent spokes, comprising means for securing said bars to spokes spaced various distances apart, one of said bars having an offset end portion provided with a key-hole slot, the other one of said bars having a shank extending toward said other bar and provided with a crosshead, a chain having a link at one end for manipulation over said crosshead, and a coupling member at the other end of said chain, comprising a head adapted to be manipulated through said key-hole slot, the length of said chain being such as to prevent said link from becoming detached from said shank without first uncoupling said coupling member from said last-named clamping bar.

2. The combination with a vehicle wheel of means for securing an anti-skid chain thereto, comprising a pair of bars, means for clamping said bars upon opposite sides of a pair of adjacent spokes, one of said bars having an offset end portion provided with a key-hole slot, the other one of said bars having a shank extending toward said other bar and provided with a crosshead, a chain having a link at one end for manipulation over said crosshead, and a coupling member at the other end of said chain, comprising a head adapted to be manipulated through said key-hole slot.

3. Means for securing an anti-skid chain to a wheel, comprising a pair of bars adapted to be secured to opposite sides of adjacent spokes of a wheel, one of said bars being provided with an opening, the other of said bars being provided with a shank extending at an angle thereto and toward said first-named bar, a chain having a link at one end for engaging said shank and a crosshead at the other end adapted to be manipulated through said opening.

4. Means for securing an anti-skid chain to a wheel, comprising a pair of bars adapted to be secured to opposite sides of adjacent spokes of a wheel, one of said bars being provided with an opening, the other of said bars being provided with a shank extending at an angle thereto and toward said first-named bar, a chain having a link at one end for engaging said shank and a coupling member at the other end adapted to be received by said opening.

5. The combination with a vehicle wheel of means for securing an anti-skid chain thereto, comprising a pair of bars, means for securing said bars to opposite sides of said wheel, one of said bars being provided with a shank portion extending between adjacent spokes of said wheel, a chain having a link for receiving said shank portion, and means for securing the other end of said chain to the other bar, so as to prevent the removal of said link from said shank portion.

6. Means for securing a chain to a vehicle wheel comprising a bar adapted to be clamped against the lateral surfaces of a pair of adjacent spokes of the wheel, said bar being provided with a shank extending laterally therefrom, said shank arranged to lie in the space between a pair of adjacent spokes of the wheel, the free end of said shank being provided with a cross-head for the purpose set forth.

7. Means for securing a chain to a vehicle wheel comprising a bar adapted to be clamped in position against the lateral surface of a wheel spoke, said bar being provided at each end with a shank extending laterally therefrom, said shanks arranged to lie in the spaces between adjacent spokes of the wheel when the bar is clamped in position as aforesaid, said shanks being provided with cross-heads for the purpose set forth.

8. Means for securing one end of an anti-skid chain to a vehicle wheel comprising a bar adapted to be secured against a lateral surface of the wheel and provided with a shank extending laterally from said bar, said shank provided with a cross head and arranged to project into the space between adjacent spokes of the wheel, when the bar is secured in position as aforesaid.

9. Means for securing one end of an anti-skid chain to a vehicle wheel consisting of a bar adapted to be secured against a lateral surface of the wheel, said bar provided with an end portion of reduced width, said end portion of reduced width turning at an abrupt angle to provide a shank extending laterally from the plane of said bar, said shank projecting into the space between adjacent spokes of the wheel when the bar is secured in position as aforesaid.

10. The combination with a wheel of means for securing one end of an anti-skid chain thereto, comprising an elongated bar having a shank extending at an angle thereto and means for clamping said bar to a lateral surface of the wheel, with said shank extending into the space between adjacent spokes, the said shank having a free end over which the link of a chain can be engaged.

11. Means for securing an end of an anti-skid chain to a vehicle wheel comprising a bar adapted to be secured to the wheel and to be disposed in a plane parallel to the side surfaces of the wheel, said bar provided with a shank extending laterally therefrom and lying between a pair of adjacent spokes of the wheel, when said bar is secured in position as aforesaid.

In witness whereof, I hereunto subscribe my name this 27th day of January, 1919.

WILLIAM H. KRUG.

Witnesses:
EDNA V. GUSTAFSON,
FAE PETRIE.